United States Patent
Noh (10) Patent No.: US 11,565,573 B2
(45) Date of Patent: Jan. 31, 2023

(54) APPARATUS AND METHOD FOR CONTROLLING AIR CONDITIONING OF VEHICLE

(71) Applicants: Hyundai Motor Company, Seoul (KR); Kia Motors Corporation, Seoul (KR)

(72) Inventor: Gwi Hwan Noh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 420 days.

(21) Appl. No.: 16/788,876

(22) Filed: Feb. 12, 2020

(65) Prior Publication Data
US 2021/0053413 A1    Feb. 25, 2021

(30) Foreign Application Priority Data
Aug. 23, 2019    (KR) .................. 10-2019-0103861

(51) Int. Cl.
*B60H 1/24*    (2006.01)
*B60H 1/00*    (2006.01)

(52) U.S. Cl.
CPC ......... *B60H 1/008* (2013.01); *B60H 1/00849* (2013.01)

(58) Field of Classification Search
USPC .................................... 454/69–165
See application file for complete search history.

(56) References Cited

U.S. PATENT DOCUMENTS

| | | | |
|---|---|---|---|
| 2016/0176261 A1* | 6/2016 | Khorana | B60H 1/00821 62/126 |
| 2018/0281554 A1* | 10/2018 | Duan | B60H 3/00 |
| 2020/0207298 A1* | 7/2020 | Wensley | B60H 1/008 |
| 2020/0346511 A1* | 11/2020 | Hasegawa | B60H 1/008 |

FOREIGN PATENT DOCUMENTS

WO    WO-2019082395 A1 *    5/2019    ......... B60H 1/00785

* cited by examiner

*Primary Examiner* — Ko-Wei Lin
(74) *Attorney, Agent, or Firm* — Fox Rothschild LLP (57) ABSTRACT

An apparatus and method for controlling air conditioning of a vehicle are provided. The apparatus includes a sensing device that measures a pollutant concentration and a carbon dioxide concentration in the vehicle using at least one sensor. A controller determines an in-vehicle air condition based on the pollutant concentration and the carbon dioxide concentration, and automatically switches an in-vehicle air circulation mode based on a determination result.

18 Claims, 9 Drawing Sheets

| IN-VEHICLE AIR CONDITION | | AIR CIRCULATION MODE | |
|---|---|---|---|
| POLLUTANT | CO2 | POLLUTANT MINIMIZATION PRIORITY MODE | CO2 MINIMIZATION PRIORITY MODE |
| GOOD | SAFETY | INSIDE AIR OR OUTSIDE AIR (MAINTENANCE OF CURRENT STATE) | |
| GOOD | ATTENTION | OUTSIDE AIR | |
| GOOD | DANGER | OUTSIDE AIR | |
| NORMAL | SAFETY | INSIDE AIR | |
| NORMAL | ATTENTION | INSIDE AIR | OUTSIDE AIR |
| NORMAL | DANGER | OUTSIDE AIR | |
| BAD | SAFETY | INSIDE AIR | |
| BAD | ATTENTION | INSIDE AIR | |
| BAD | DANGER | OUTSIDE AIR | |

APPARATUS AND METHOD FOR CONTROLLING AIR CONDITIONING OF VEHICLE

CROSS-REFERENCE TO RELATED APPLICATION

This application claims the benefit of priority to Korean Patent Application No. 10-2019-0103861, filed on Aug. 23, 2019, the entire contents of which are incorporated herein by reference.

TECHNICAL YIELD

The present disclosure relates to an apparatus for controlling air conditioning of a vehicle and a method thereof, and more particularly to an apparatus and method of controlling vehicle air conditioning that minimizes the concentration of carbon dioxide in the vehicle while minimizing the inflow of pollutants into the vehicle.

BACKGROUND

In-vehicle air circulation may be divided into an outside air circulation scheme and an inside air circulation scheme. The outside air circulation scheme refers to a method of injecting air outside the vehicle to discharge muddy air to an outside. The inside air circulation scheme refers to a method of circulating air inside the vehicle.

In recent years, since it is more difficult to introduce and circulate air outside the vehicle due to pollutants, air is circulated in the vehicle in an inside air circulation scheme, which increases the concentration of carbon dioxide in the vehicle, which may cause the driver to fall asleep while driving. Therefore, there is a need to develop a technology capable of minimizing the concentration of carbon dioxide in the vehicle while minimizing the inflow of pollutants into the vehicle.

SUMMARY

The present disclosure provides an apparatus and a method for controlling air conditioning of a vehicle that minimizes the concentration of carbon dioxide in the vehicle while minimizing the inflow of pollutants into the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling air conditioning of a vehicle may include a sensing device configured to measure a pollutant concentration and a carbon dioxide concentration in the vehicle using at least one of sensors, and a controller configured to determine an in-vehicle air condition based on the pollutant concentration and the carbon dioxide concentration, and configured to automatically switch an in-vehicle air circulation mode based on a determination result.

The controller may be configured to determine the in-vehicle air condition corresponding to the pollutant concentration as at least one of good, normal and bad based on a preset determination reference value. The controller may also be configured to determine the in-vehicle air condition that corresponds to the carbon dioxide concentration as at least one of safety, attention, and danger based on a preset determination reference value. The controller may then be configured to adjust the preset determination reference value that corresponds to a user setting mode in determining the in-vehicle air condition.

The user setting mode may include a pollutant minimization priority mode and a carbon dioxide minimization priority mode. The controller may be configured to adjust the determination reference value from good to normal in the pollutant minimization priority mode to be less than the determination reference value of the in-vehicle air condition from good to normal in the carbon dioxide minimization priority mode when the user setting mode is the pollutant minimization priority mode.

The controller may be configured to adjust the determination reference value from good to normal in the carbon dioxide minimization priority mode to be greater than the determination reference value from good to normal in the pollutant minimization priority mode when the user setting mode is the carbon dioxide minimization priority mode. Additionally, the controller may be configured to adjust the determination reference value from safety to attention in the pollutant minimization priority mode to be greater than the determination reference value from safety to attention in the carbon dioxide minimization priority mode when the user setting mode is the pollutant minimization priority mode.

The controller may be configured to adjust the determination reference value from safety to attention in the carbon dioxide minimization priority mode to be less than the determination reference value from safety to attention in the pollutant minimization priority mode when the user setting mode is the carbon dioxide minimization priority mode. The controller may be configured to automatically switch the in-vehicle air circulation mode to an inside air circulation mode or an outside air circulation mode corresponding to the in-vehicle air condition determined based on the pollutant concentration and the carbon dioxide concentration.

According to another aspect of the present disclosure, a method of controlling air conditioning of a vehicle may include measuring a pollutant concentration and a carbon dioxide concentration in the vehicle, determining an in-vehicle air condition based on the pollutant concentration and the carbon dioxide concentration, and automatically switching an in-vehicle air circulation mode based on the determination result.

The in-vehicle air condition corresponding to the pollutant concentration may be determined as at least one of good, normal and bad based on a preset determination reference value. The in-vehicle air condition that corresponds to the carbon dioxide concentration may be determined as at least one of safety, attention, and danger based on a preset determination reference value. The method may further include adjusting the preset determination reference value corresponding to a user setting mode in determining the in-vehicle air condition.

The user setting mode may include a pollutant minimization priority mode and a carbon dioxide minimization priority mode. The determination reference value from good to normal in the pollutant minimization priority mode may be adjusted to be less than the determination reference value from good to normal in the carbon dioxide minimization priority mode when the user setting mode is the pollutant minimization priority mode. The determination reference value from good to normal in the carbon dioxide minimization priority mode may be adjusted to be greater than the determination reference value from good to normal in the pollutant minimization priority mode when the user setting mode is the carbon dioxide minimization priority mode.

The determination reference value from safety to attention in the pollutant minimization priority mode may be adjusted to be greater than the determination reference value from safety to attention in the carbon dioxide minimization priority mode when the user setting mode is the pollutant minimization priority mode. The determination reference value from safety to attention in the carbon dioxide minimization priority mode may be adjusted to be less than the determination reference value from safety to attention in the pollutant minimization priority mode when the user setting mode is the carbon dioxide minimization priority mode. The in-vehicle air circulation mode may be executed to automatically switch to an inside air circulation mode or an outside air circulation mode corresponding to the in-vehicle air condition determined based on the pollutant concentration and the carbon dioxide concentration.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
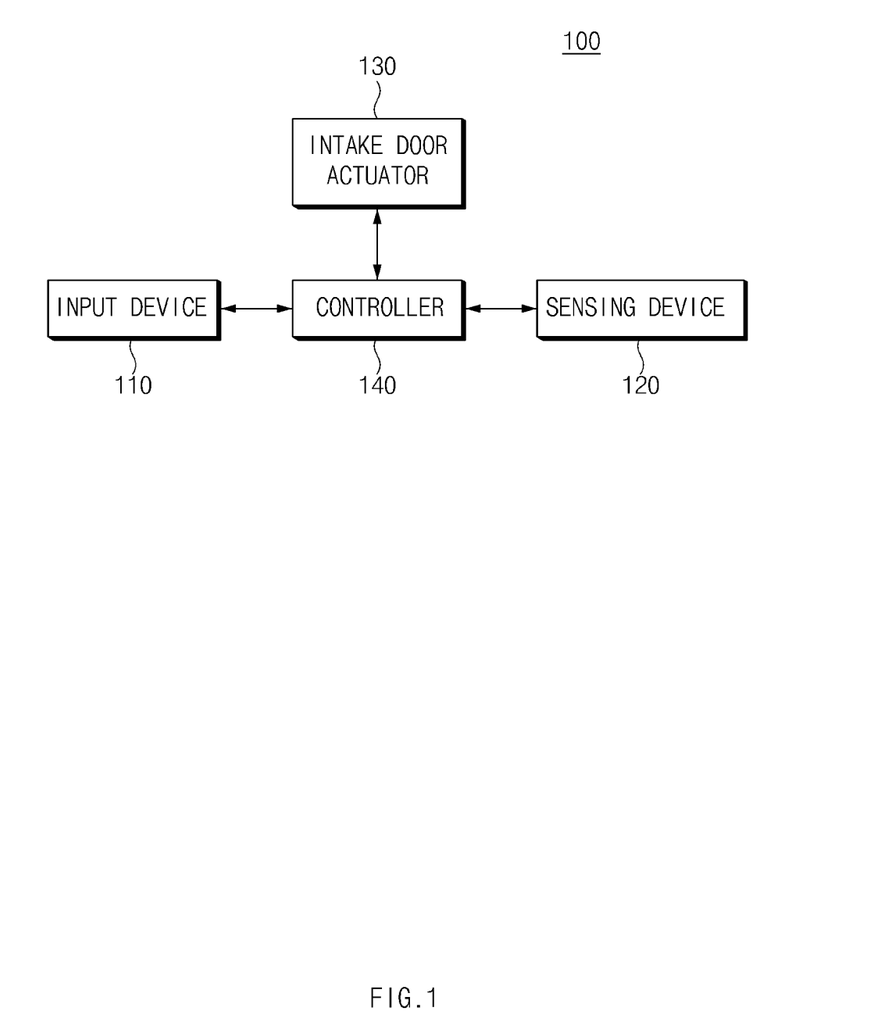
FIG. 1 is a block diagram illustrating an apparatus for controlling air conditioning of a vehicle according to an exemplary embodiment of the present disclosure.

FIG. 1 is a block diagram illustrating an apparatus for controlling air conditioning of a vehicle according to an exemplary embodiment of the present disclosure. As illustrated in FIG. 1, an apparatus 100 for controlling air conditioning of a vehicle according to an exemplary embodiment of the present disclosure may include an input device 110, a sensing device 120, an intake door actuator 130, and a controller 140. The controller 140 may be configured to operate the other components of apparatus. The sensing device 120 may be a single sensor or may include a plurality of sensors.

Particularly, the input device 110 may be configured to receive an input signal that corresponds to a manipulation, an operation, or voice of an occupant, and the controller 140 may be configured to determine a user setting mode that corresponds to the input signal input to the input device 110. The user setting mode may include a pollutant minimization priority mode and a carbon dioxide minimization priority mode. Notably, the pollutant minimization priority mode may be understood as a mode capable of being selected by a user when the user does not desire to introduce pollutants into the vehicle. Additionally, the carbon dioxide minimization priority mode may be understood as a mode capable of being selected by the user when the user does not desire to increase the carbon dioxide concentration in the vehicle.

The input device 110 may be implemented with a scroll wheel, a button, a knob, a touch screen, a touch pad, a lever, a track ball, or the like that may be operated or otherwise manipulated by a user, or with at least one of a motion sensor and a voice recognition sensor configured to detect the motion or voice of an occupant, and a combination thereof. The sensing device 120 may be configured to measure a pollutant concentration and a carbon dioxide concentration in the vehicle using at least one of sensors. In particular, the pollutant may be a particle or gaseous substance, and may include sulfate, nitrate, carbon, and the like. In addition, the pollutant may include a particle matter (PM) of which the particle size is very small.

The intake door actuator 130 may be rotatively operated between an inside air inlet connected to an inside air flow passage of the vehicle and an outside air inlet connected to an outside air flow passage of the vehicle and may be configured to drive or operate an intake door to selectively open and close the inside air inlet and the outside air inlet. The intake door actuator 130 may be operated when the air circulation mode is switched corresponding to the result of determining an in-vehicle air condition by the controller 140. The controller 140 may be implemented with various processing devices such as a microprocessor incorporating a semiconductor chip or the like that can perform the operation or execution of various instructions, and may be configured to execute the overall operation of an apparatus for controlling air conditioning of a vehicle according to an exemplary embodiment of the present disclosure.

In particular, the controller 140 may be configured to determine the in-vehicle air condition based on the pollutant concentration and the carbon dioxide concentration measured by the sensing device 120, and automatically change the air circulation mode in the vehicle based on the determination result. The controller 140 may be configured to determine the in-vehicle air condition as at least one of good, normal, and bad based on the pollutant concentration. For example, the in-vehicle air condition may be classified as a first level, a second level, and a third level, increasing in pollutant concentration. That is, the first level may be considered as a satisfactory condition based on the pollutant concentration, the third level may be considered as an unsafe level based on the pollutant concentration, and the second level may be greater than the first and less than the third.

According to an exemplary embodiment, the controller 140 may be configured to determine the in-vehicle air condition as at least one of good, normal, and bad based on a preset reference (e.g., WHO international standard) based on the pollutant concentration. In addition, the controller 140 may be configured to determine the in-vehicle air condition as at least one of safety, caution, and danger based on the carbon dioxide concentration. According to an exemplary embodiment, the controller 140 may be configured to determine the in-vehicle air condition as at least one of safety, caution, and danger based on a preset reference (e.g., indoor air quality maintenance standard) based on the carbon dioxide concentration. For example, the safety condition may be defined as a carbon dioxide concentration level that is safe for passengers and no change is required, the caution condition may be defined as a carbon dioxide concentration level that remains safe but is approaching a higher risk level, and a danger level may be defined as a carbon dioxide concentration level that is dangers to passengers and requires a change. According to an exemplary embodiment, the range of determination reference value of the pollutant concentration and the carbon dioxide concentration is shown in Table 1 and 2.

TABLE 1

| The pollutant concentration(10 μg/m³) | Determination result |
|---|---|
| 0~30 | Good |
| 31~50 | Normal |
| 50~ | Bad |

TABLE 2

| Carbon dioxide concentration(ppm) | Determination result |
|---|---|
| 0~1000 | Safety |
| 1001~2000 | Caution |
| 2000~ | Danger |

The controller 140 may be configured to determine the user setting mode based on the input signal input to the input device 110. The user setting mode may include the pollutant minimization priority mode and the carbon dioxide minimization priority mode. The pollutant minimization priority mode may be understood as a mode selectable by a user when the user does not desire to introduce pollutants into the vehicle. In addition, the carbon dioxide minimization priority mode may be understood as a mode selectable by the user when the user does not desire to increase the carbon dioxide concentration in the vehicle.

According to an exemplary embodiment of the present disclosure, the controller 140 may be configured to determine the in-vehicle air condition with reference to the preset reference based on the pollutant concentration and the carbon dioxide concentration, and may be configured to adjust a determination reference value of the in-vehicle air condition corresponding to the user setting mode. For example, when the user setting mode is the pollutant minimization priority mode, the controller 140 may be configured to adjust the determination reference value of the in-vehicle air condition from good to normal in the pollutant minimization priority mode to be less than the determination reference value of the in-vehicle air condition from good to normal in the carbon dioxide minimization priority mode (e.g., determination criteria enhancement). More details thereof will be described with reference to FIG. 2.

→Refer to Table 1and Table 2.

As another example, when the user setting mode is the carbon dioxide minimization priority mode, the controller 140 may be configured to adjust the determination reference value of the in-vehicle air condition from good to normal in the carbon dioxide minimization priority mode to be greater than the determination reference value from good to normal in the pollutant minimization priority mode (determination criteria relaxation). More details thereof will be described with reference to FIG. 3.

As still another example, when the user setting mode is the pollutant minimization priority mode, the controller 140 may be configured to adjust the determination reference of the in-vehicle air condition from safety to attention in the pollutant minimization priority mode to be greater than the determination reference of the in-vehicle air condition from safety to attention in the carbon dioxide minimization priority mode (determination criteria relaxation). More details thereof will be described with reference to FIG. 4.

As still another example, when the user setting mode is the carbon dioxide minimization priority mode, the controller 140 may be configured to adjust the determination reference of the in-vehicle air condition from safety to attention in the carbon dioxide minimization priority mode to be less than the determination reference of the in-vehicle air condition from safety to attention in the pollutant minimization priority mode. More details thereof will be described with reference to FIG. 5.

In addition, the controller 140 may be configured to automatically switch to at least one circulation mode of the inside air circulation mode or the outside air circulation mode that corresponds to the in-vehicle air condition determined based on the pollutant concentration and the carbon dioxide concentration. More details will be described with reference to FIG. 6.

Figure 2:
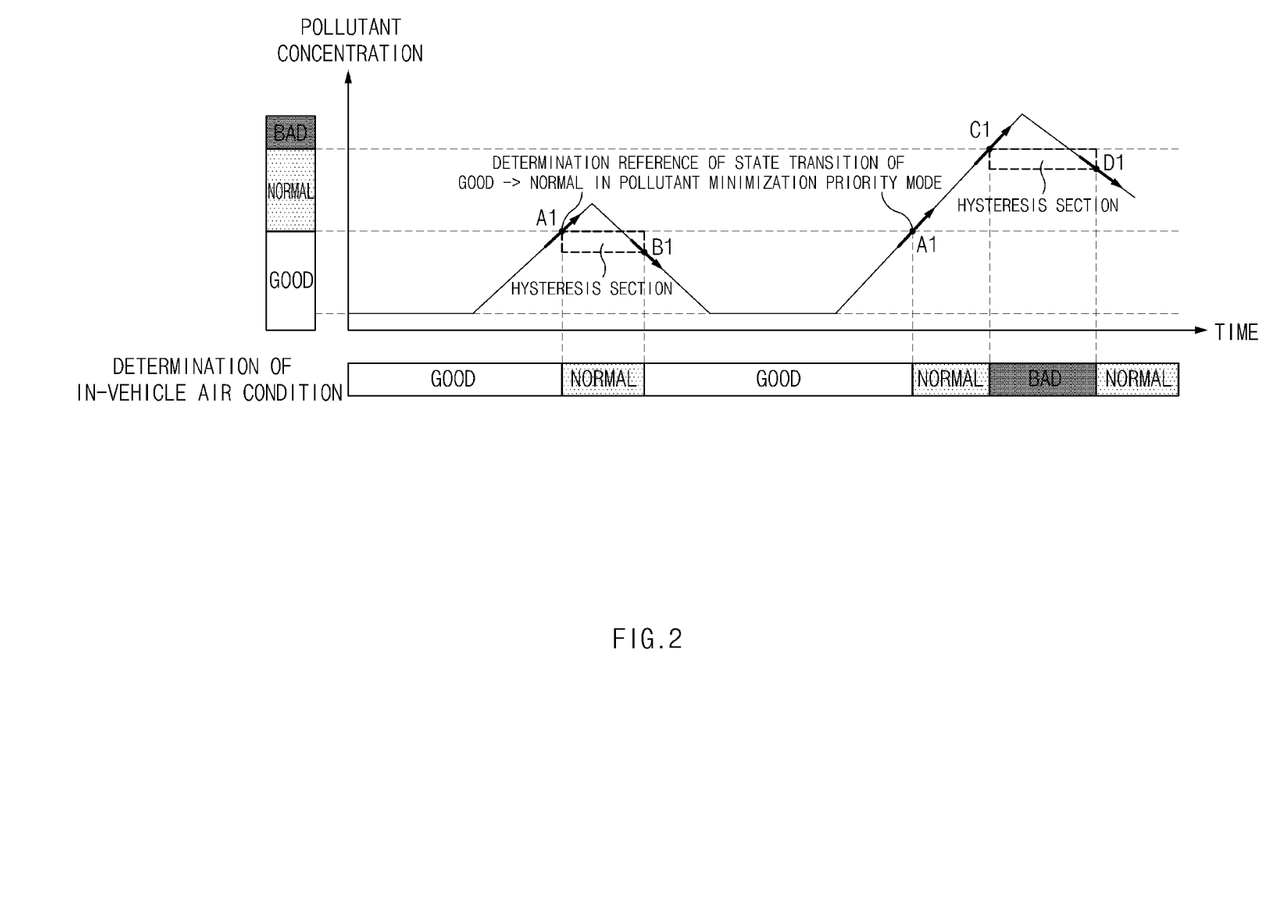
FIG. 2 is a view illustrating a scheme of determining an in-vehicle air condition based on a pollutant concentration according to an exemplary embodiment of the present disclosure.

FIG. 2 is a view illustrating a scheme of determining an in-vehicle air condition based on a pollutant concentration according to an exemplary embodiment of the present disclosure. In particular, when the pollutant minimization priority mode is selected in the user setting mode, the in-vehicle air condition may be determined. To minimize the pollutant concentration of the air in the vehicle in the user setting mode, the controller 140 may be configured to adjust the determination reference value of the in-vehicle air condition from good to normal in the pollutant minimization priority mode to be less than the determination reference value of the in-vehicle air condition from good to normal in the carbon dioxide minimization priority mode (determination criteria enhancement).

As shown in FIG. 2, the controller 140 may be configured to determine the in-vehicle air condition as at least one of good, normal, and bad with reference to a preset reference based on the pollutant concentration, and execute the air circulation mode of the vehicle based on the determination result. When the pollutant concentration is continuously changed with respect to the determination reference value, the in-vehicle air condition may be continuously changed and the air circulation mode may be changed indefinitely. Accordingly, to prevent such a phenomenon, the determination reference value may be set with hysteresis sections which are set between good and normal and between normal and bad. For example, the controller 140 may be configured to set the determination reference value A1 for determining the transition from good to normal to be greater than the determination reference value B1 for determining the transition from normal to good. In addition, the controller 140 may be configured to set the determination reference value C1 for determining the transition from normal to bad to be greater than the determination reference value D1 for determining the transition from bad to normal. →Refer to Table 1 and Table 2.

Figure 3:
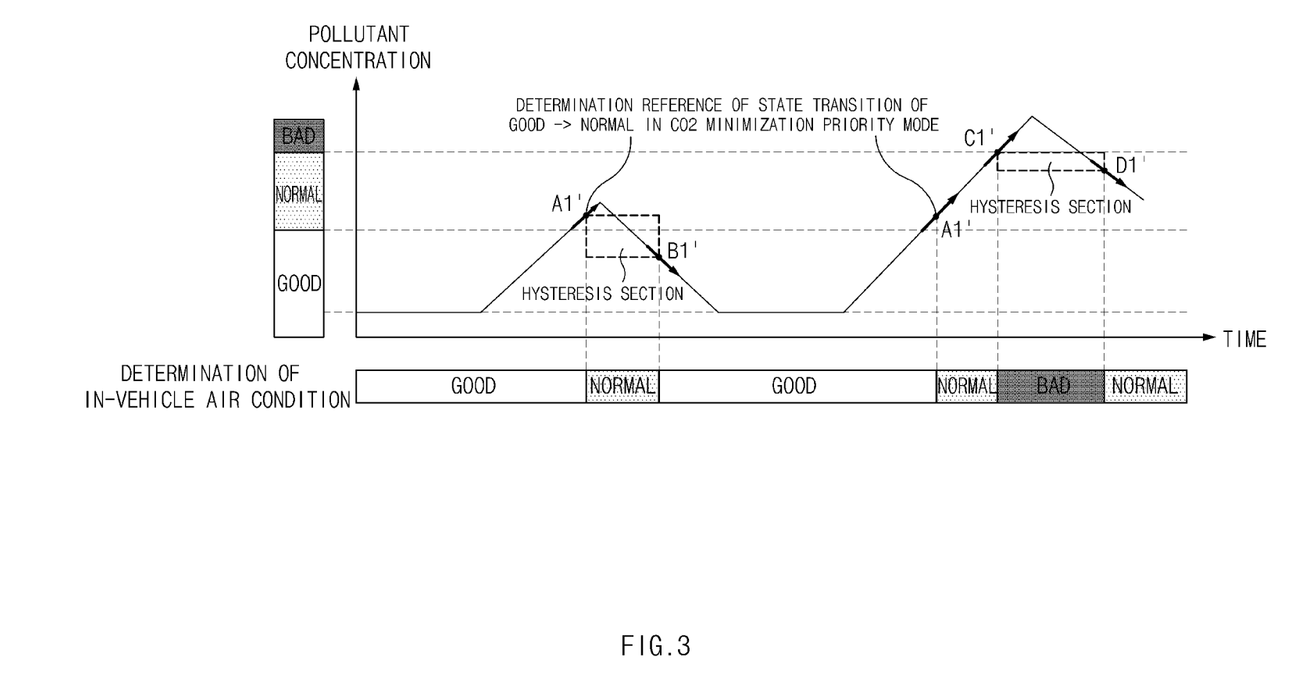
FIG. 3 is a view illustrating a scheme of determining an in-vehicle air condition based on a pollutant concentration according to an exemplary embodiment of the present disclosure.

FIG. 3 is a view illustrating a scheme of determining an in-vehicle air condition based on a pollutant concentration according to an exemplary embodiment of the present disclosure. In particular, when the carbon dioxide minimization priority mode is selected in the user setting mode, the in-vehicle air condition may be determined. To minimize the carbon dioxide concentration of the air in the vehicle in the user setting mode, the controller 140 may be configured to adjust the determination reference value of the in-vehicle air condition from good to normal in the carbon dioxide minimization priority mode to be greater than the determination reference value of the in-vehicle air condition from good to normal in the pollutant minimization priority mode (determination criteria relaxation).

As shown in FIG. 3, the controller 140 may be configured to determine the in-vehicle air condition as at least one of good, normal, and bad with reference to a preset reference based on the pollutant concentration, and execute the air circulation mode of the vehicle based on the determination result. When the pollutant concentration is continuously changed with respect to the determination reference value, the in-vehicle air condition may be continuously changed and the air circulation mode may be changed indefinitely. Accordingly, to prevent such a phenomenon, the determination reference value may be set with hysteresis sections which are set between good and normal and between normal and bad. For example, the controller 140 may be configured to set the determination reference value A1' that is determined to be normal from good to greater than the determination reference value B1' that is determined to be good from normal. In addition, the controller 140 may be configured to set the determination reference value C1' for determining the transition from normal to bad to be greater than the determination reference value D1' for determining the transition from bad to good.

Figure 4:
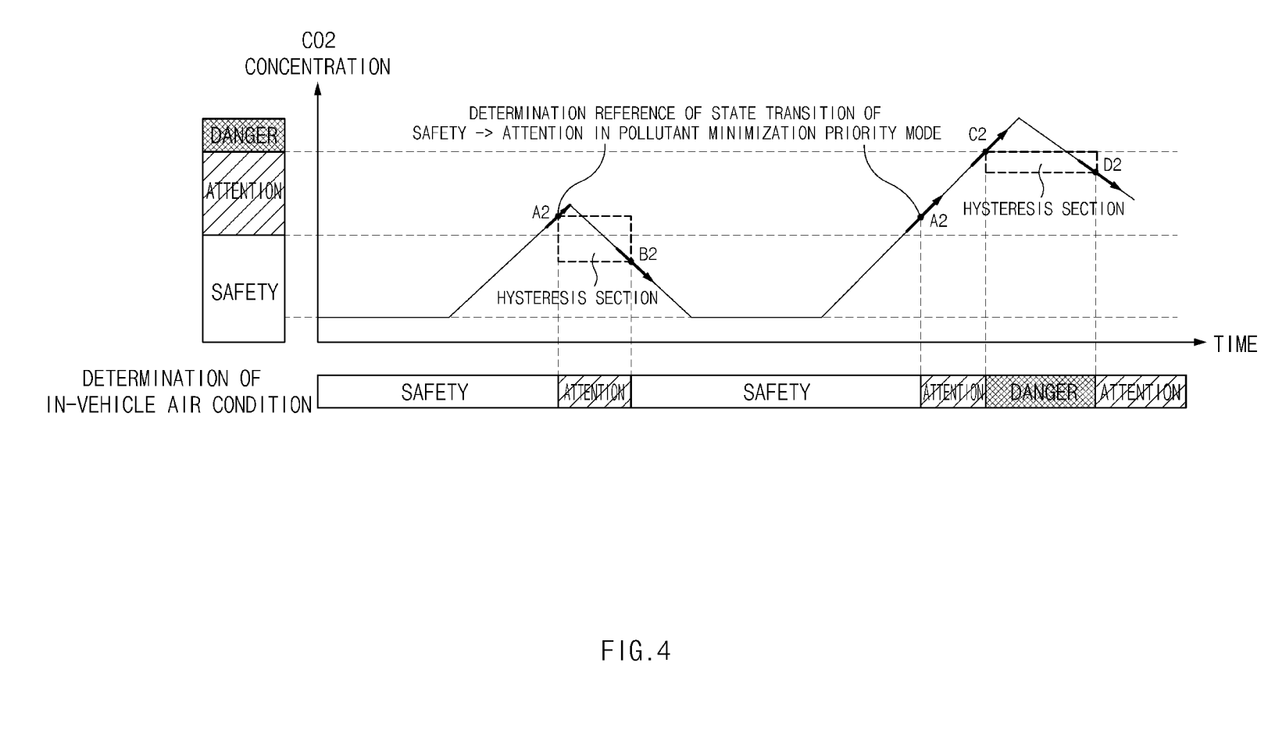
FIG. 4 is a view illustrating a scheme of determining an in-vehicle air condition based on a carbon dioxide concentration according to an exemplary embodiment of the present disclosure.

FIG. 4 is a view illustrating a scheme of determining an in-vehicle air condition based on a carbon dioxide concentration according to an exemplary embodiment of the present disclosure. In particular, when the pollutant minimization priority mode is selected in the user setting mode, the in-vehicle air condition may be determined. To minimize the pollutant concentration of the air in the vehicle in the user setting mode, the controller 140 may be configured to adjust the determination reference value of the in-vehicle air condition from safety to attention in the pollutant minimization priority mode to be greater than the determination reference value of the in-vehicle air condition from attention to safety in the carbon dioxide minimization priority mode (determination criteria relaxation).

As shown in FIG. 4, the controller 140 may be configured to determine the in-vehicle air condition as at least one of safety, attention, and danger with reference to a preset reference based on the carbon dioxide concentration, and execute the air circulation mode of the vehicle based on the determination result. When the carbon dioxide concentration is continuously changed with respect to the determination reference value, the in-vehicle air condition may be continuously changed and the air circulation mode may be changed indefinitely. Accordingly, to prevent such a phenomenon, the determination reference value may be set with hysteresis sections which are set between safety and attention and between attention and danger. For example, the controller 140 may be configured to set the determination reference value A2 for determining the transition from safety to attention to be greater than the determination reference value B2 for determining the transition from attention to safety. In addition, the controller 140 may be configured to set the determination reference value C2 for determining the transition from normal to bad to be greater than the determination reference value D2 for determining the transition from bad to normal.

Figure 5:
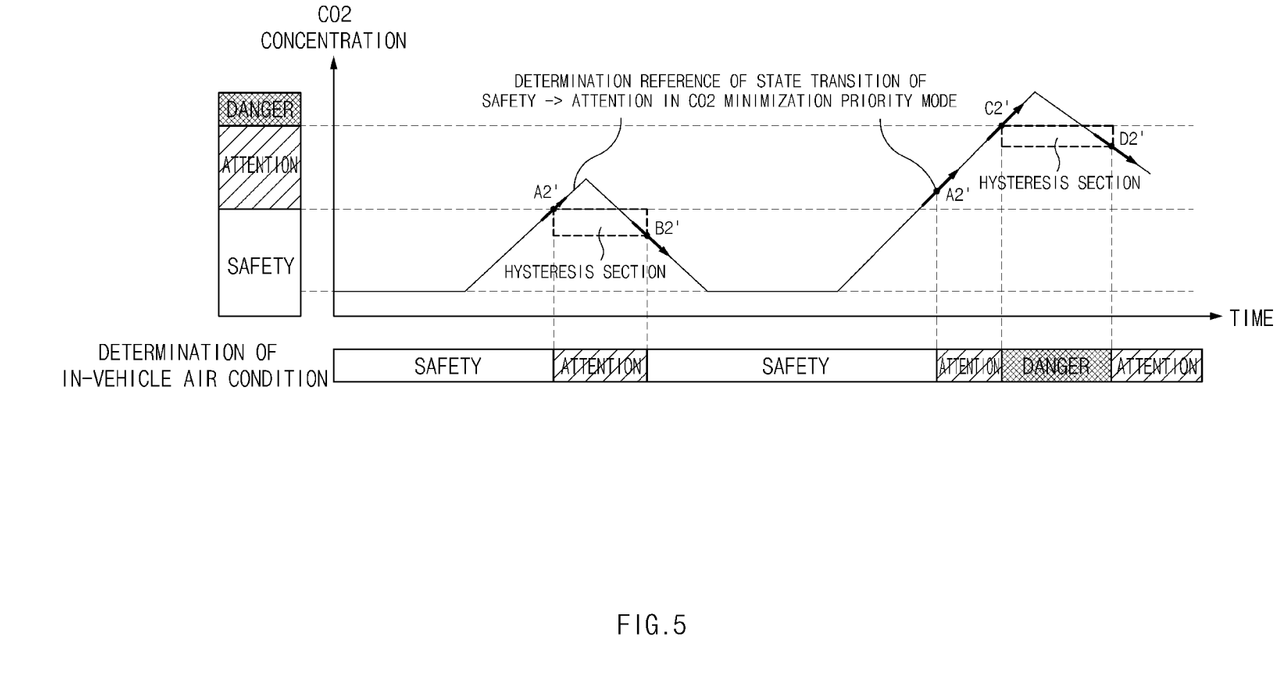
FIG. 5 is a view of determining an in-vehicle air condition based on a carbon dioxide concentration according to an exemplary embodiment of the present disclosure.

FIG. 5 is a view of determining an in-vehicle air condition based on a carbon dioxide concentration according to an exemplary embodiment of the present disclosure. In particular, when the carbon dioxide minimization priority mode is selected in the user setting mode, the in-vehicle air condition may be determined. To minimize the carbon dioxide concentration of the air in the vehicle in the user setting mode, the controller 140 may be configured to adjust the determination reference value of the in-vehicle air condition from safety to attention in the carbon dioxide minimization priority mode to be less than the determination reference value of the in-vehicle air condition from good to normal in the pollutant minimization priority mode (determination criteria enhancement).

As shown in FIG. 5, the controller 140 may be configured to determine the in-vehicle air condition as at least one of safety, attention, and danger with reference to a preset reference based on the carbon dioxide concentration, and execute the air circulation mode of the vehicle based on the determination result. When the carbon dioxide concentration is continuously changed with respect to the determination reference value, the in-vehicle air condition may be continuously changed and the air circulation mode may be changed indefinitely. Accordingly, to prevent such a phenomenon, the determination reference value may be set with hysteresis sections which are set between safety and attention and between attention and danger. For example, the controller 140 may be configured to set the determination reference value A2' for determining the transition from safety to attention to be greater than the determination reference value B2' for determining the transition from attention to safety. In addition, the controller 140 may be configured to set the determination reference value C2' for determining the transition from normal to bad to be greater than the determination reference value D2' for determining the transition from bad to normal.

Figure 6:
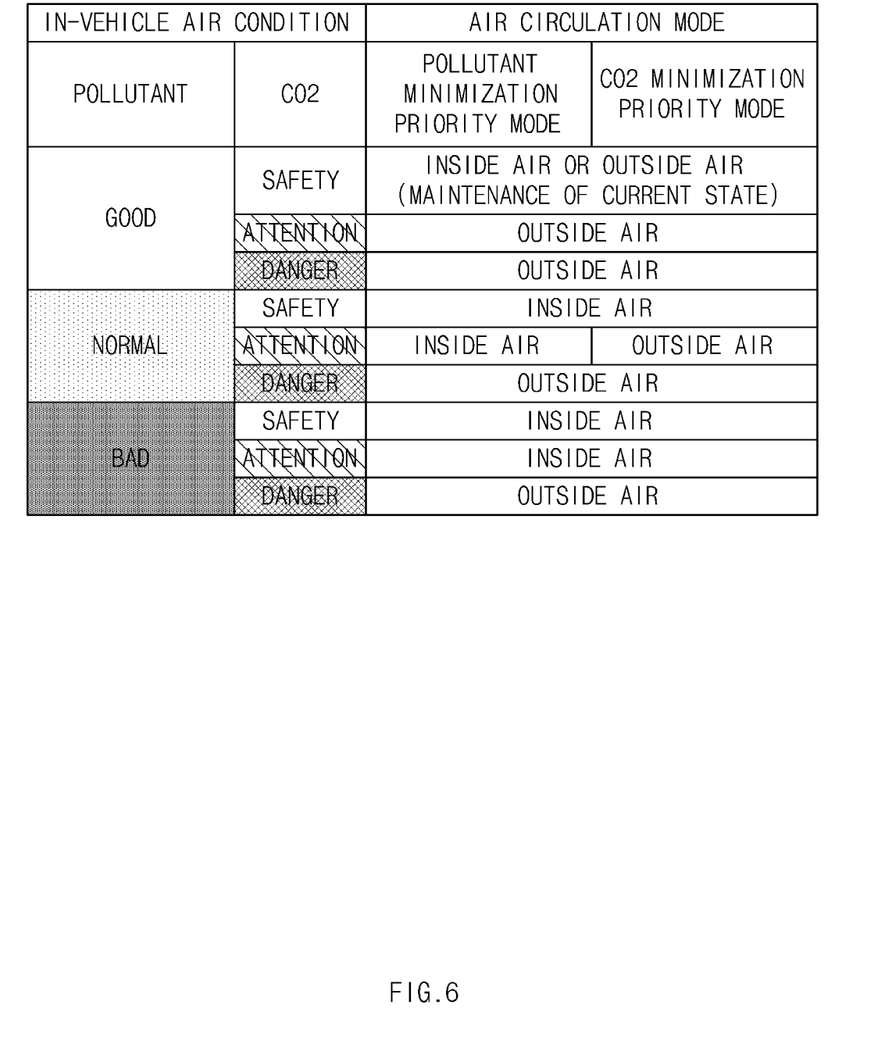
FIG. 6 is a view illustrating a scheme of controlling an air circulation mode corresponding to a vehicle state determined according to an exemplary embodiment of the present disclosure.

FIG. 6 is a view illustrating a scheme of controlling an air circulation mode corresponding to an in-vehicle air condition determined according to an exemplary embodiment of the present disclosure. As illustrated in FIG. 6, according to an exemplary embodiment of the present disclosure, the controller 140 may be configured to execute the air circulation mode corresponding to the in-vehicle air condition determined based on the determination reference value adjusted corresponding to the user setting mode. For example, the controller 140 may be configured to determine the in-vehicle air condition as at least one of good, normal and bad based on the pollutant concentration and may be configured to determine the in-vehicle air condition as at least one of safety, attention and danger based on the carbon dioxide concentration.

According to an exemplary embodiment, when the in-vehicle air condition is in a state where the pollutant concentration is good and the carbon dioxide concentration is safe, the controller 140 may be configured to maintain a current air circulation condition since the pollutant concentration and the carbon dioxide concentration are low. In addition, when the pollutant concentration is good and the carbon dioxide concentration is in an attention (or danger) state, the controller 140 may be configured to automatically switch the air circulation mode to the outside air circulation mode to decrease the carbon dioxide concentration. When the pollutant concentration is normal and the carbon dioxide concentration is in a safe state, the controller 140 may be configured to automatically switch to the inside air circulation mode to decrease the pollutant concentration in the vehicle. The controller 140 may be configured to differently execute the air circulation mode that corresponds to the user setting mode when the in-vehicle air condition is normal and attention. In other words, the air circulation mode is executed different based on what the in-vehicle condition is determined to be.

Further, the controller 140 may be configured to automatically switch the air circulation mode to the inside air circulation mode to decrease the pollutant concentration when the in-vehicle air condition is normal and attention and the user setting mode is the pollutant minimization priority mode. When the user setting mode is the carbon dioxide minimization priority mode, the controller 140 may be configured to automatically switch the air circulation mode to the outside air circulation mode to decrease the carbon dioxide concentration. When the pollutant concentration is normal, and the carbon dioxide concentration is in a dangerous state, the controller 140 may be configured to automatically switch the air circulation mode to the outside air circulation mode to decrease the carbon dioxide concentration. When the pollutant concentration is bad and the carbon dioxide concentration is in a safe (or attention) state, the controller 140 may be configured switch to the inside air circulation mode to decrease the pollutant concentration. When the pollutant concentration is bad and the carbon dioxide concentration is in a dangerous state, the controller 140 may be configured to automatically switch to the outside air circulation mode to decrease the carbon dioxide concentration.

Figure 7:
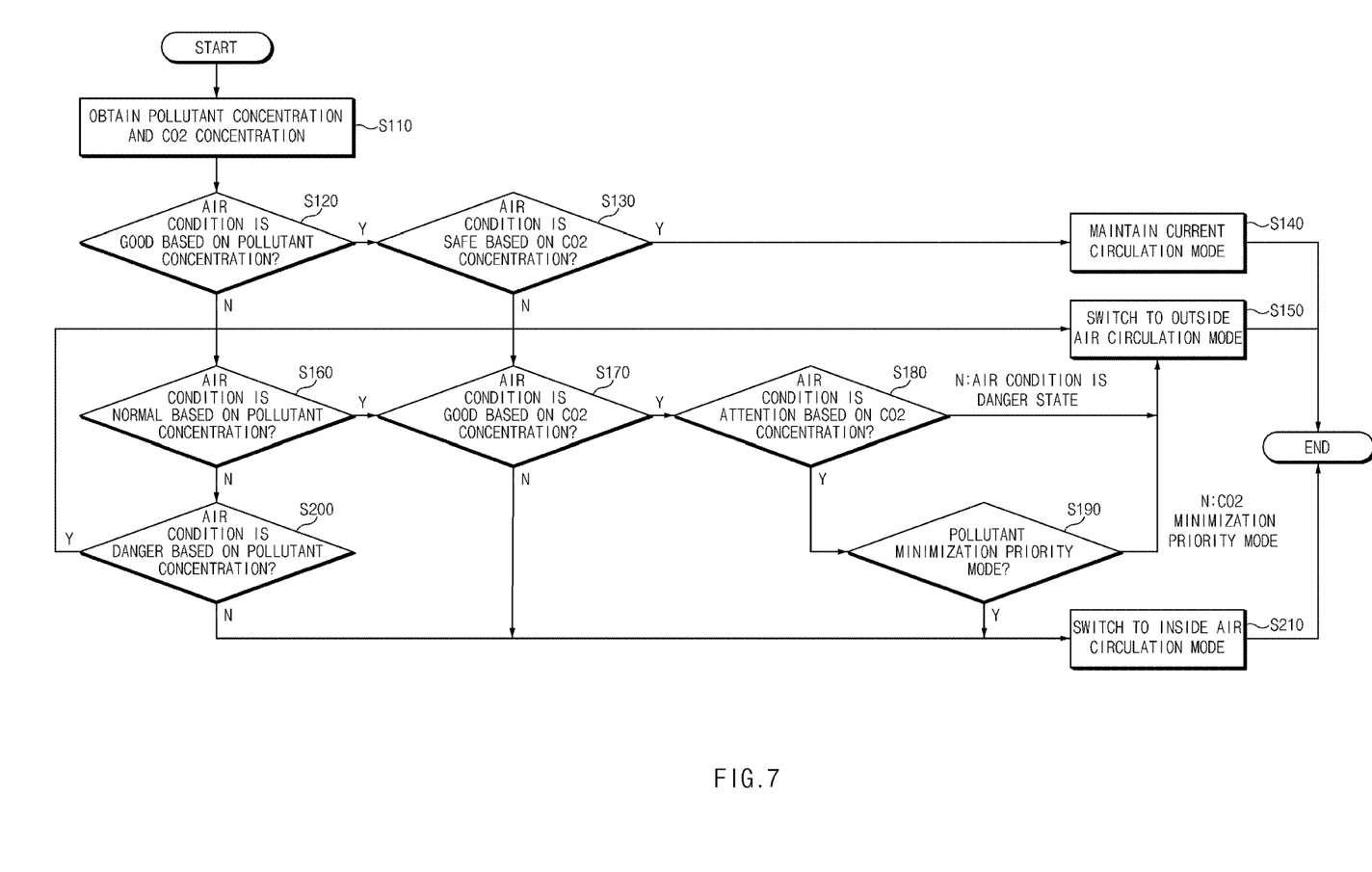
FIG. 7 is a flowchart illustrating a method of controlling air conditioning of a vehicle according to an exemplary embodiment of the present disclosure.

FIG. 7 is a flowchart illustrating a method of controlling air conditioning of a vehicle according to an exemplary embodiment of the present disclosure. As illustrated in FIG. 7, in operation S110, the controller 140 may be configured to obtain the pollutant concentration and the carbon dioxide concentration measured by the sensing device 120. In operation S120, the controller 140 may be configured to determine whether the in-vehicle air condition is good based on the pollutant concentration obtained in S110. In response to determining in operation S120 that the in-vehicle air condition is good (Y), in operation S130, the controller 140 may be configured to determine whether the in-vehicle air condition is safe based on the carbon dioxide concentration obtained in operation S110.

In response to determining in operation S130 that the in-vehicle air condition is safe (Y), the controller 140 may be configured to maintain the current air circulation mode in operation S140. In response to determining in operation S130 that the in-vehicle air condition is not safe (N), the controller 140 may be configured to execute the air circulation mode to automatically switch to the outside air circulation mode in operation S150. Meanwhile, in response to determining in operation S120 that the in-vehicle air condition is not good (N), in operation S160, the controller 140 may be configured to determine whether the in-vehicle air condition is normal based on the pollutant concentration obtained in operation S110. In response to determining in operation S160 that the in-vehicle air condition is normal (Y), in operation S170, the controller 140 may be configured to determine whether the in-vehicle air condition is safe based on the carbon dioxide concentration obtained in operation S110.

In response to determining in operation S170 that the in-vehicle air condition is not safe (N), in operation S180, the controller 140 may be configured to determine whether the in-vehicle air condition is attention or caution based on the carbon dioxide concentration obtained in operation S110. In response to determining in operation S180 that the in-vehicle air condition is not attention (N), the controller 140 may be configured to determine the in-vehicle air condition as a danger state and automatically switch to the outside air circulation mode to reduce the carbon dioxide concentration in the vehicle in operation S150. Additionally, in response to determining in operation S180 that the in-vehicle air condition is attention (Y), the controller 140 may be configured to determine whether the user setting mode is the pollutant minimization priority mode in operation S190. In response to determining in operation S190 that the user setting mode is the pollutant minimization priority mode (Y), the controller 140 may be configured to automatically switch to the inside air circulation mode to reduce the pollutant concentration in operation S210. In response to determining in operation S190 that the user setting mode is not the pollutant minimization priority mode (N), the controller 140 may be configured to determine that the user setting mode is CO2 minimization priority mode and automatically switch to the outside air circulation mode.

Meanwhile, in response to determining in operation S160 that the in-vehicle air condition is not normal (N), in operation S200, the controller 140 may be configured to determine that the in-vehicle air condition is bad, and determine whether the in-vehicle air condition is dangerous based on the carbon dioxide concentration obtained in operation S110. In response to determining in operation step S200 that the in-vehicle air condition is not dangerous (N), in operation S210, the controller 140 may be configured to determine that the in-vehicle air condition is safe (or attention) and automatically switch to the inside air circulation mode to reduce the pollutant concentration in the vehicle. Additionally, in response to determining in operation S200 that the in-vehicle air condition is dangerous (Y), the controller 140 may be configured to automatically switch to the outside air circulation mode to reduce the carbon dioxide concentration in the vehicle in operation S150.

Figure 8:
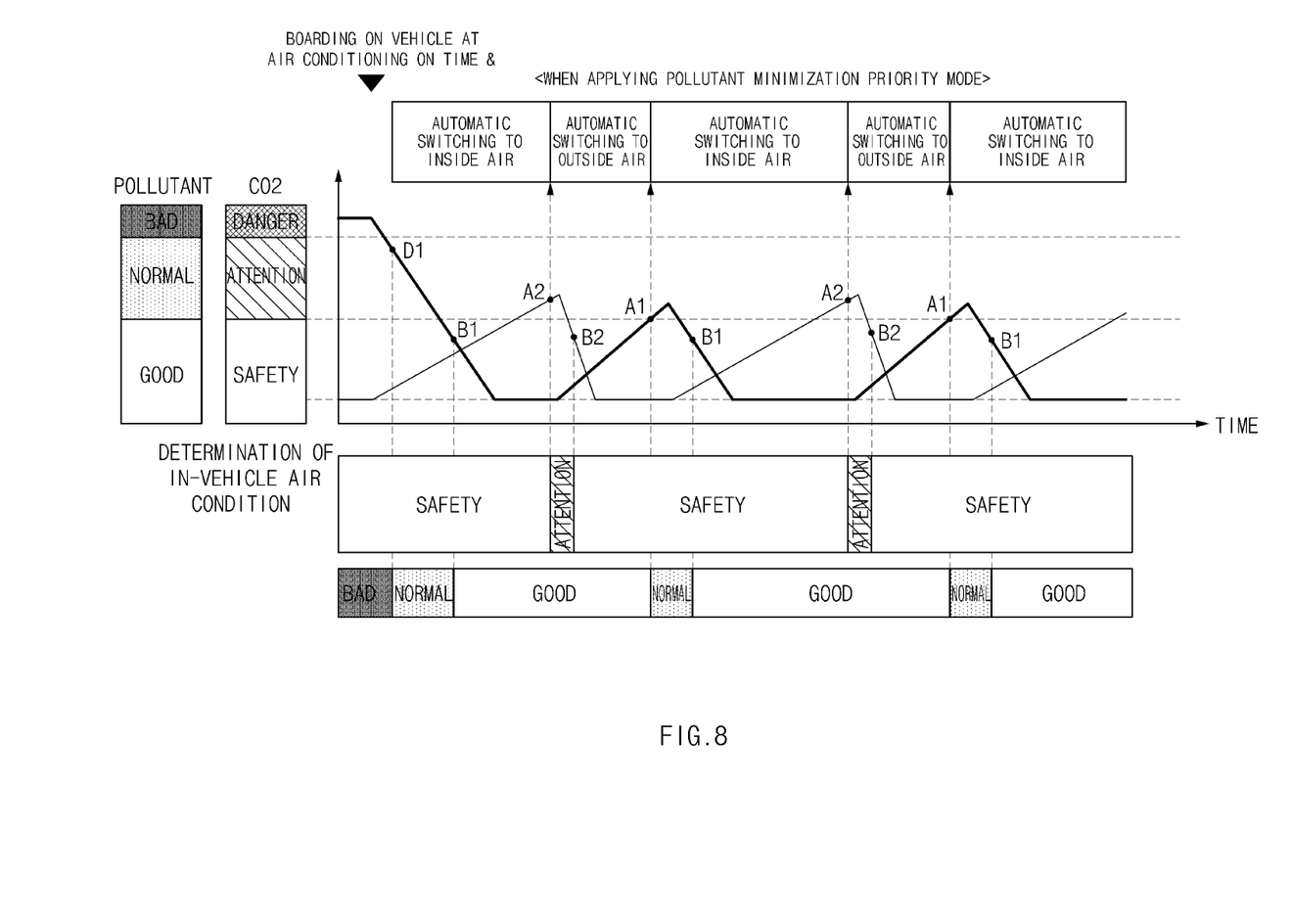
FIG. 8 is a view schematically illustrating a scheme of automatically switching based on an in-vehicle air condition determined according to an exemplary embodiment of the present disclosure.

FIG. 8 is a view schematically illustrating a scheme of automatically switching based on an in-vehicle air condition determined according to an exemplary embodiment of the present disclosure. FIG. 8 illustrates a case where the user setting mode is set to the pollutant minimization priority mode. As illustrated in FIG. 8, the controller 140 may be configured to obtain the pollutant concentration and the carbon dioxide concentration at the time when the user boards or enters the vehicle. The controller 140 may be configured to determine that the in-vehicle air condition is bad based on the pollutant concentration at the boarding time and is safe based on the carbon dioxide concentration. The controller 140 may be configured to automatically switch the air circulation mode to the inside air circulation mode to reduce the pollutant concentration in the vehicle corresponding to the result of determining the in-vehicle air condition (see FIG. 6).

As the air circulation mode is switched to the inside air circulation mode, the pollutant concentration in the vehicle is decreased, but the carbon dioxide concentration is gradually increased. When the carbon dioxide concentration is gradually increased and the carbon dioxide concentration exceeds the determination reference value A2 for determining the carbon dioxide concentration as the transition from safety to attention, the controller 140 may be configured to determine the in-vehicle air condition as attention, and determine the in-vehicle air condition as good based on the pollutant concentration at this time. The controller 140 may be configured to automatically switch the air circulation mode to the outside air circulation mode to reduce the carbon dioxide concentration in the vehicle corresponding to the determination result of the in-vehicle air condition (see FIG. 6).

As the air circulation mode is switched to the outdoor air circulation mode, the carbon dioxide concentration in the vehicle is decreased, but the pollutant concentration is gradually increased. When the pollutant concentration gradually increases and the pollutant concentration exceeds the determination reference value A1 for determining the transition from good to normal, the controller 140 may be configured to determine the in-vehicle air condition as normal and at this time, determine the in-vehicle air condition as safety based on the carbon dioxide concentration. The controller 140 may be configured to automatically switch the air circulation mode to the inside air circulation mode to reduce the pollutant concentration in the vehicle corresponding to the result of determining the in-vehicle air condition (see FIG. 6). As described above, the controller 140 according to the present disclosure may provide the user with high-quality air by automatically switching the air circulation mode corresponding to the in-vehicle air condition that is determined based on the pollutant concentration and the carbon dioxide concentration.

Figure 9:
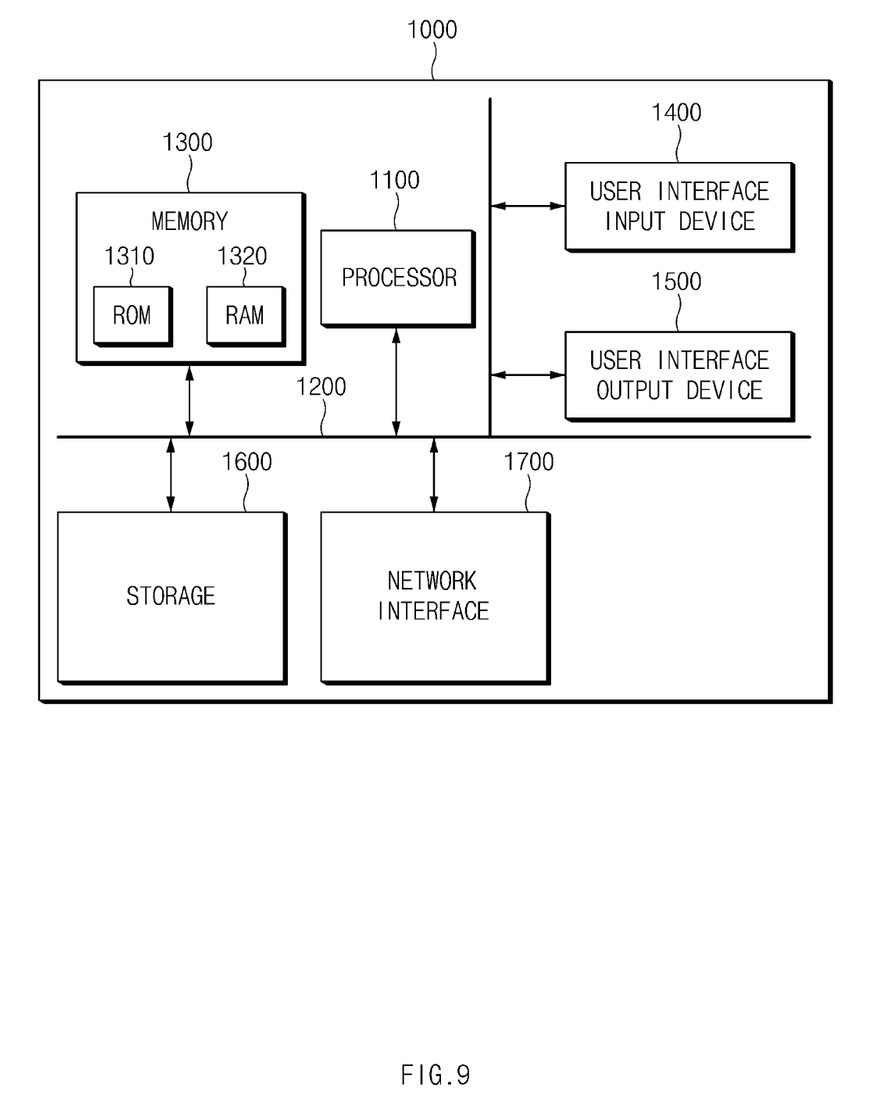
FIG. 9 is a view illustrating a computing system that executes a method according to an exemplary embodiment of the present disclosure.

FIG. 9 is a view illustrating a computing system that executes a method according to an exemplary embodiment of the present disclosure. Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the apparatus and method for controlling air conditioning of a vehicle of the embodiments, the air circulation mode in the vehicle may be automatically switched, to minimize the carbon dioxide concentration in the vehicle while minimizing the introduction of pollutants into the vehicle. Therefore, it may be possible to reduce the risk of an accident of a driver and to provide high quality air into the vehicle.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed exemplary embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. An apparatus for controlling air conditioning of a vehicle, comprising:
    at least one of plurality of sensors configured to measure a pollutant concentration and a carbon dioxide concentration in the vehicle; and
    a controller configured to determine an in-vehicle air condition based on the pollutant concentration and the carbon dioxide concentration, and automatically switch an in-vehicle air circulation mode based on the determination result,
    wherein the controller is configured to determine the in-vehicle air condition corresponding the pollutant concentration based on a preset first determination reference value and the carbon dioxide concentration based on a preset second determination reference value,
    wherein the preset first determination reference value includes a first reference value when a user setting mode is a pollutant minimization priority mode and a second reference value when the user setting mode is a carbon dioxide minimization priority mode, and
    wherein the preset second determination reference value includes third reference value when the user setting mode is the pollutant minimization priority mode and fourth reference value when the user setting mode is the carbon dioxide minimization priority mode.

2. The apparatus of claim 1, wherein the controller is configured to determine the in-vehicle air condition corresponding to the pollutant concentration as at least one of good, normal, and bad based on the first reference value or the second reference value.

3. The apparatus of claim 1, wherein the controller is configured to determine the in-vehicle air condition corresponding to the carbon dioxide concentration as at least one of safety, attention, and danger based on the third reference value or the fourth reference value.

4. The apparatus of claim 3, wherein the controller is configured to adjust the preset first determination reference value or the preset second determination reference value corresponding to a user setting mode in determining the in-vehicle air condition.

5. The apparatus of claim 1, wherein the controller is configured to adjust the first reference value from good to normal in the pollutant minimization priority mode to be less than the second reference value from good to normal in the carbon dioxide minimization priority mode when the user setting mode is the pollutant minimization priority mode.

6. The apparatus of claim 1, wherein the controller is configured to adjust the second reference value from good to normal in the carbon dioxide minimization priority mode to be greater than the first reference value from good to normal in the pollutant minimization priority mode when the user setting mode is the carbon dioxide minimization priority mode.

7. The apparatus of claim 1, wherein the controller is configured to adjust the third reference value from safety to attention in the pollutant minimization priority mode to be greater than the fourth reference value from safety to attention in the carbon dioxide minimization priority mode when the user setting mode is the pollutant minimization priority mode.

8. The apparatus of claim 1, wherein the controller is configured to adjust the fourth reference value from safety to attention in the carbon dioxide minimization priority mode to be less than the third reference value from safety to attention in the pollutant minimization priority mode when the user setting mode is the carbon dioxide minimization priority mode.

9. The apparatus of claim 1, wherein the controller is configured to automatically switch the in-vehicle air circulation mode to an inside air circulation mode or an outside air circulation mode corresponding to the in-vehicle air condition determined based on the pollutant concentration and the carbon dioxide concentration.

10. A method of controlling air conditioning of a vehicle, comprising:
obtaining by a controller, a pollutant concentration and a carbon dioxide concentration in the vehicle;
determining, by the controller, an in-vehicle air condition based on the pollutant concentration and the carbon dioxide concentration; and
automatically switching, by the controller, an in-vehicle air circulation mode based on the determination result;
wherein the controller is configured to determine the in-vehicle air condition corresponding the pollutant concentration based on a preset first determination reference value and the carbon dioxide concentration based on a preset second determination reference value,
wherein the preset first determination reference value includes a first reference value when a user setting mode is a pollutant minimization priority mode and a second reference value when the user setting mode is a carbon dioxide minimization priority mode, and
wherein the preset second determination reference value includes third reference value when the user setting mode is the pollutant minimization priority mode and fourth reference value when the user setting mode is the carbon dioxide minimization priority mode.

11. The method of claim 10, wherein the in-vehicle air condition corresponding to the pollutant concentration is determined as at least one of good, normal, and bad based on the first reference value or the second reference value.

12. The method of claim 10, wherein the in-vehicle air condition corresponding to the carbon dioxide concentration is determined as at least one of safety, attention, and danger based on the third reference value or the fourth reference value.

13. The method of claim 12, further comprising:
adjusting, by the controller, the preset first determination reference value or preset second determination reference value corresponding to a user setting mode in determining the in-vehicle air condition.

14. The method of claim 10, wherein the first reference value from good to normal in the pollutant minimization priority mode is adjusted to be less than the second reference value from good to normal in the carbon dioxide minimization priority mode when the user setting mode is the pollutant minimization priority mode.

15. The method of claim 10, wherein the second reference value from good to normal in the carbon dioxide minimization priority mode is adjusted to be greater than the first reference value from good to normal in the pollutant minimization priority mode when the user setting mode is the carbon dioxide minimization priority mode.

16. The method of claim 10, wherein the third reference value from safety to attention in the pollutant minimization priority mode is adjusted to be greater than the fourth reference value from safety to attention in the carbon dioxide minimization priority mode when the user setting mode is the pollutant minimization priority mode.

17. The method of claim 10, wherein the fourth reference value from safety to attention in the carbon dioxide minimization priority mode is adjusted to be less than the third reference value from safety to attention in the pollutant minimization priority mode when the user setting mode is the carbon dioxide minimization priority mode.

18. The method of claim 10, wherein the in-vehicle air circulation mode is automatically switched to an inside air circulation mode or an outside air circulation mode corresponding to the in-vehicle air condition determined based on the pollutant concentration and the carbon dioxide concentration.

* * * * *